United States Patent
Baeuerle et al.

(10) Patent No.: US 9,021,392 B2
(45) Date of Patent: Apr. 28, 2015

(54) MANAGING EXTENSION PROJECTS WITH REPOSITORY BASED TAGGING

(75) Inventors: Stefan A. Baeuerle, Rauenberg (DE); Uwe Schlarb, Ostringen (DE); Bernhard Thimmel, Edingen-Neckarhausen (DE); Frank Jentsch, Mülhausen (DE); Jurgen Specht, Benningen (DE); Karsten Fanghänel, Schwetzingen (DE); Matthias Lebr, Weinheim (DE); Klaus Rauer, Alsbach-Hachnlein (DE)

(73) Assignee: SAP SE, Walldorf (DE)

( * ) Notice: Subject to any disclaimer, the term of this patent is extended or adjusted under 35 U.S.C. 154(b) by 827 days.

(21) Appl. No.: 12/843,180

(22) Filed: Jul. 26, 2010

(65) Prior Publication Data
US 2012/0023445 A1    Jan. 26, 2012

(51) Int. Cl.
| | |
|---|---|
| G06F 3/048 | (2013.01) |
| G06F 9/44 | (2006.01) |
| G06F 17/30 | (2006.01) |
| G06Q 40/00 | (2012.01) |
| G06F 9/445 | (2006.01) |
| G06F 3/0482 | (2013.01) |

(52) U.S. Cl.
CPC *G06Q 40/00* (2013.01); *G06F 8/36* (2013.01); *G06F 8/65* (2013.01); *G06F 8/68* (2013.01); *G06F 3/0482* (2013.01); *G06F 8/71* (2013.01)

(58) Field of Classification Search
CPC ............... G06F 8/36; G06F 8/65; G06F 8/68; G06F 8/71; G06F 3/0482
USPC ............................ 707/803, E17.044; 715/810
See application file for complete search history.

(56) References Cited

U.S. PATENT DOCUMENTS

| | | | | |
|---|---|---|---|---|
| 5,603,027 | A * | 2/1997 | Ohkami | 717/170 |
| 5,632,009 | A * | 5/1997 | Rao et al. | 715/201 |
| 5,956,513 | A * | 9/1999 | McLain, Jr. | 717/142 |
| 6,035,305 | A * | 3/2000 | Strevey et al. | 1/1 |
| 6,052,531 | A * | 4/2000 | Waldin et al. | 717/170 |
| 6,112,024 | A * | 8/2000 | Almond et al. | 717/122 |
| 6,199,204 | B1 * | 3/2001 | Donohue | 717/178 |
| 6,216,175 | B1 * | 4/2001 | Sliger et al. | 717/169 |
| 6,314,424 | B1 * | 11/2001 | Kaczmarski et al. | 1/1 |
| 6,460,052 | B1 * | 10/2002 | Thomas et al. | 707/695 |
| 6,574,635 | B2 * | 6/2003 | Stauber et al. | 707/704 |
| 6,745,389 | B1 * | 6/2004 | Hostyn et al. | 719/315 |
| 6,766,334 | B1 * | 7/2004 | Kaler et al. | 1/1 |
| 7,383,534 | B1 * | 6/2008 | Agbabian et al. | 717/120 |
| 7,437,712 | B1 * | 10/2008 | Brown et al. | 717/122 |
| 7,609,651 | B1 * | 10/2009 | McBride et al. | 370/252 |
| 2002/0040469 | A1 * | 4/2002 | Pramberger | 717/121 |

(Continued)

OTHER PUBLICATIONS

"Rational Clearcase and Clearcase LT," IBM, Version 7.0.0, May 2006. (60 pages).*

*Primary Examiner* — Eric J Bycer
(74) *Attorney, Agent, or Firm* — Buckley, Maschoff & Talwalkar LLC

(57) ABSTRACT

According to some embodiments, information about a delta change package may be received. The delta change package may be, for example, associated with a customer extension project to be applied to content from a business service provider. A description tag for the delta change package may be received from a user, and the delta change package may be associated with the description tag in a repository of the business service provider.

17 Claims, 19 Drawing Sheets

(56) References Cited

U.S. PATENT DOCUMENTS

| | | | |
|---|---|---|---|
| 2002/0154555 A1* | 10/2002 | Krueger et al. | 365/200 |
| 2004/0002880 A1* | 1/2004 | Jones | 705/7 |
| 2004/0010429 A1* | 1/2004 | Vedula et al. | 705/7 |
| 2004/0059704 A1* | 3/2004 | Hellerstein et al. | 707/1 |
| 2004/0181773 A1* | 9/2004 | Mortensen et al. | 717/101 |
| 2004/0261053 A1* | 12/2004 | Dougherty et al. | 717/101 |
| 2005/0021536 A1* | 1/2005 | Fiedler et al. | 707/100 |
| 2005/0172261 A1* | 8/2005 | Yuknewicz et al. | 717/106 |
| 2005/0234931 A1* | 10/2005 | Yip et al. | 707/100 |
| 2006/0225032 A1* | 10/2006 | Klerk et al. | 717/105 |
| 2006/0294141 A1* | 12/2006 | Tsang et al. | 707/104.1 |
| 2008/0127084 A1* | 5/2008 | Sattler et al. | 717/121 |
| 2008/0163253 A1* | 7/2008 | Massmann et al. | 719/316 |
| 2009/0083268 A1* | 3/2009 | Coqueret et al. | 707/6 |
| 2009/0183150 A1* | 7/2009 | Felts | 717/173 |
| 2009/0210852 A1* | 8/2009 | Martineau | 717/101 |
| 2011/0231178 A1* | 9/2011 | Gery et al. | 703/22 |

* cited by examiner

| Entity Type | Extended Entity | Adaptation | User | Date/Time (saved) | Ext-Project | Version | Publish | Publish/discard |
|---|---|---|---|---|---|---|---|---|
| UI | Account OIF | Add field revenue per employee | A | 15.2.12 14:00 | Direct Sales | A-OIF-01 | 15.2.12 14:00 | X |
| | Account QAF | Add field revenue per employee | A | 15.2.12 14:02 | Direct Sales | A-QAF-01 | 15.2.12 14:02 | X |

| Entity Type | Extended Entity | Adaptation | User | Date/Time (saved) | Ext-Project | Version | Publish | Publish/discard |
|---|---|---|---|---|---|---|---|---|
| UI | Account OIF | Add field revenue per employee | A | 15.2.12 14:00 | Direct Sales | A-OIF-01 | 15.2.12 14:00 | X |
|  | Account QAF | Add field revenue per employee | A | 15.2.12 14:02 | Direct Sales | A-QAF-01 | 15.2.12 14:02 | X |
| UI | Delivery OIF | Add field EAN | A | 15.2.12 14:08 | Direct Sales | D-OIF-01 | 15.2.12 14:08 | X |
| Form | Delivery Note | Add field EAN | A | 15.2.12 14:10 | Direct Sales | F-DN-01 | 15.2.12 14:10 | x |

| Entity Type | Extended Entity | Adaptation | User | Date/Time (saved) | Ext-Project | Version | Publish | Publish/discard |
|---|---|---|---|---|---|---|---|---|
| UI | Account OIF | Add field revenue per employee | A | 15.2.12 14:00 | Direct Sales | A-OIF-01 | 15.2.12 14:00 | X |
|  |  | Add field language | B | 15.2.12 16:00 | Social CRM | A-OIF-02 | 15.2.12 16:02 | X |
|  | Account QAF | Add field revenue per employee | A | 15.2.12 14:02 | Direct Sales | A-QAF-01 | 15.2.12 14:02 | X |
|  | Delivery OIF | Add field EAN | A | 15.2.12 14:08 | Direct Sales | D-OIF-01 | 15.2.12 14:08 | X |
| Form | Delivery Note | Add field EAN | A | 15.2.12 14:10 | Direct Sales | F-DN-01 | 15.2.12 14:10 | x |

FIG. 9

| Entity Type | Extended Entity | Adaptation | Ext-Project | Version | Publish | Publish/discard | User | Date/Time (saved) |
|---|---|---|---|---|---|---|---|---|
| BO | Account | New field revenue per employee<br>New field language | Direct Sales, Social CRM | BO-ACC-02 | 15.2.12 14:00 | X | A, B | 15.2.12 14:00... |
|  | Delivery Note | New field EAN | Direct Sales | BO-DN-01 | 15.2.12 14:08 | X | A | 15.2.12 14:08 |
| UI | Account OIF | Add field revenue per employee<br>Add field language | Direct sales, Social CRM | A-OIF-02 | 15.2.12 14:00 | X | A, B | 15.2.12 14:00... |
|  | Account QAF | Add field revenue per employee | Direct Sales | A-QAF-01 | 15.2.12 14:02 | X | A | 15.2.12 14:02 |
|  | Delivery OIF | Add field EAN | Direct Sales | D-OIF-01 | 15.2.12 14:08 | X | A | 15.2.12 14:08 |
| Form | Delivery Note | Add field EAN | Direct Sales | F-DN-01 | 15.2.12 14:10 | x | A | 15.2.12 14:10 |

| Entity Type | Extended Entity | Adaptation | Ext-Project | Version | Publish | Publish/discard | User | Date/Time (saved) |
|---|---|---|---|---|---|---|---|---|
| BO | Account | New field revenue per employee<br>New field language | Direct Sales, Social CRM | BO-ACC-02 | 15.2.12 14:00 | X | A, B | 15.2.12 14:00... |
| | | New field revenue per employee | Direct Sales | BO-ACC-01 | 15.2.12 14:00 | X | A | 15.2.12 14:00... |
| | Delivery Note | New field EAN | Direct Sales | V01 | 15.2.12 14:08 | X | A | 15.2.12 14:08 |
| UI | Account OIF | Add field revenue per employee<br>Add field language | Direct sales, Social CRM | V02 | 15.2.12 14:00 | X | A, B | 15.2.12 14:00... |
| | Account QAF | Add field revenue per employee | Direct Sales | V01 | 15.2.12 14:02 | X | A | 15.2.12 14:02 |
| | Delivery OIF | Add field EAN | Direct Sales | V01 | 15.2.12 14:08 | X | A | 15.2.12 14:08 |
| Form | Delivery Note | Add field EAN | Direct Sales | V01 | 15.2.12 14:10 | x | A | 15.2.12 14:10 |

| Entity Type | Extended Entity | Adaptation | Ext- Project | Version | Publish | Publish/ discard | User | Date/Time (saved) |
|---|---|---|---|---|---|---|---|---|
| BO | Account | New field revenue per employee<br>New field language | Direct Sales, Social CRM | BO-ACC-02 | 15.2.12 14:00 | X | A, B | 15.2.12 14:00... |
| | Delivery Note | New field EAN | Direct Sales | V01 | 15.2.12 14:08 | X | A | 15.2.12 14:08 |
| UI | Account OIF | Add field revenue per employee<br>Add field language | Direct sales, Social CRM | V02 | 15.2.12 14:00 | X | A, B | 15.2.12 14:00... |
| | | Add field revenue per employee | Direct sales | V01 | 15.2.12 14:00 | X | A | 15.2.12 14:00... |
| | Account QAF | Add field revenue per employee | Direct Sales | V01 | 15.2.12 14:02 | X | A | 15.2.12 14:02 |
| | Delivery OIF | Add field EAN | Direct Sales | V01 | 15.2.12 14:08 | X | A | 15.2.12 14:08 |
| Form | Delivery Note | Add field EAN | Direct Sales | V01 | 15.2.12 14:10 | x | A | 15.2.12 14:10 |

FIG. 12

| Entity Type | Extended Entity | Adaptation | Ext-Project | Version | Publish | Publish/discard | User | Date/Time (saved) |
|---|---|---|---|---|---|---|---|---|
| BO | Account | New field revenue per employee<br>New field language | Direct Sales, Social CRM | BO-ACC-02 | 15.2.12 14:00 | X | A, B | 15.2.12 14:00... |
| | Delivery Note | New field EAN | Direct Sales | V01 | 15.2.12 14:08 | X | A | 15.2.12 14:08 |
| UI | Account OIF | Add field revenue per employee<br>Add field language | Direct sales, Social CRM | V02 | 15.2.12 14:00 | X | A, B | 15.2.12 14:00... |
| | | Add field revenue per employee | Direct sales | V01 | 15.2.12 14:00 | X | A | 15.2.12 14:00... |
| | Account QAF | Add field revenue per employee | Direct Sales | V01 | 15.2.12 14:02 | X | A | 15.2.12 14:02 |
| | Delivery OIF | Add field EAN | Direct Sales | V01 | 15.2.12 14:08 | X | A | 15.2.12 14:08 |
| Form | Delivery Note | Add field EAN | Direct Sales | V01 | 15.2.12 14:10 | x | A | 15.2.12 14:10 |

| Entity Type | Extended Entity | Adaptation | Ext-Project | Version | Publish | Publish/discard | User | Date/Time (saved) |
|---|---|---|---|---|---|---|---|---|
| BO | Account | New field revenue per employee<br>New field language | Direct Sales, Social CRM | BO-ACC-02 | 15.2.12 14:00 | X | A, B | 15.2.12 14:00... |
|  | Delivery Note | New field EAN | Direct Sales | V01 | 15.2.12 14:08 | X | A | 15.2.12 14:08 |
| UI | Account OIF | Add field revenue per employee | Direct sales | V01 | 15.2.12 14:00 | x | A, B | 15.2.12 14:00... |
|  |  | Add field revenue per employee<br>Add field language | Direct sales, Social CR | V02 | 15.2.12 14:00 |  | A | 15.2.12 14:00... |
|  | Account QAF | Add field revenue per employee | Direct Sales | V01 | 15.2.12 14:02 | X | A | 15.2.12 14:02 |
|  | Delivery OIF | Add field EAN | Direct Sales | V01 | 15.2.12 14:08 | X | A | 15.2.12 14:08 |
| Form | Delivery Note | Add field EAN | Direct Sales | V01 | 15.2.12 14:10 | x | A | 15.2.12 14:10 |

| Entity Type | Extended Entity | Adaptation | User | Date/Time (saved) | Ext-Project | Delta Package | Publish | Publish/ discard |
|---|---|---|---|---|---|---|---|---|
| UI | Account OIF | Add field revenue per employee | A | 15.2.12 14:00 | Direct Sales | A-OIF-01 | 15.2.12 14:00 | X |
| | | Add field language | B | 15.2.12 16:00 | Social CRM | A-OIF-02 | 15.2.12 16:02 | X |
| UI | | Re-arrange fields | A | 15.2.12 16:30 | Direct Sales | A-OIF-03 | 15.2.12 16:30 | X |
| | Account QAF | Add field revenue per employee | A | 15.2.12 14:02 | Direct Sales | A-QAF-01 | 15.2.12 14:02 | X |
| | Delivery OIF | Add field EAN | A | 15.2.12 14:08 | Direct Sales | D-OIF-01 | 15.2.12 14:08 | X |
| Form | Delivery Note | Add field EAN | A | 15.2.12 14:10 | Direct Sales | F-DN-01 | 15.2.12 14:10 | x |

| Ext-Project | Extended Entity | Entity Type | Adaptation | User | Date/Time (saved) | Delta Package | Published | Publish/ discard |
|---|---|---|---|---|---|---|---|---|
| Direct Sales | Account OIF | UI | Add field revenue per employee | A | 15.2.12 14:00 | D-01 | 15.2.12 14:00 | X |
| | | UI | Re- arrange fields | A | 15.2.12 16:30 | D-03 | 15.2.12 16:30 | X |
| | Account QAF | UI | Add field revenue per employee | A | 15.2.12 14:02 | D-01 | 15.2.12 14:02 | X |
| | Delivery OIF | UI | Add field EAN | A | 15.2.12 14:08 | D-01 | 15.2.12 14:08 | X |
| | Delivery Note | Form | Add field EAN | A | 15.2.12 14:10 | D-01 | 15.2.12 14:10 | X |
| Social CRM | Account OIF | UI | Add field language | B | 15.2.12 16:00 | D-02 | 15.2.12 16:02 | X |

MANAGING EXTENSION PROJECTS WITH REPOSITORY BASED TAGGING

FIELD

Some embodiments relate to extension projects associated with a business service provider. More specifically, some embodiments use repository based tagging to manage extension projects.

BACKGROUND

A business service provider may provide a general framework to be used by a number of different customers or clients. For example, the business service provider might create a generic framework to store and maintain Enterprise Resource Planning (ERP) information along with a set of user interfaces. In some cases, however, a particular client might want to modify or extend the general framework (e.g., by adding a new field to a particular form). Moreover, a single client might utilize several different extensions (or versions of the generic framework) based on its business needs. For example, the client might add a tax identifier to a generic purchase order form when the form is used within Germany but not when the form is used outside Germany. According to some embodiments, one or more partners may also develop extensions and/or new applications for clients.

It can be difficult, however, for a customer or client to maintain and/or track these various versions of the business service framework. For example, a customer might want to group various extensions or adaptations in a logical way to facilitate the activation, de-activation, and/or movement of those changes. To address this need, an entirely new project management infrastructure could be created. Such an approach, however, might be an expensive undertaking and could be too complex for some customers.

Accordingly, a method and mechanism for flexibly and efficiently managing such extension projects may be provided by some embodiments herein.

BRIEF DESCRIPTION OF THE DRAWINGS

FIGS. 6 through 16 illustrate project maintenance data according to some embodiments.

DETAILED DESCRIPTION

Figure 1:
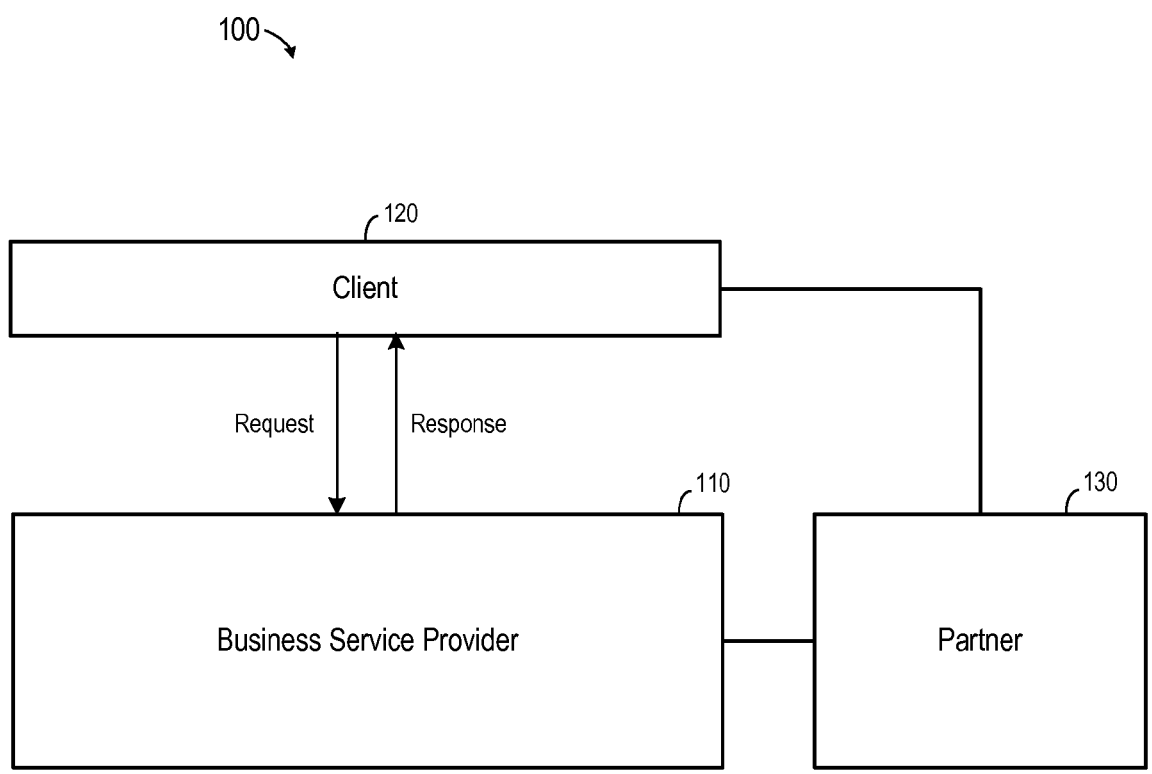
FIG. 1 is a block diagram of a system according to some embodiments.

An enterprise might store and access business information in a number of different ways. For example, an enterprise might store a substantial amount of information about production, sales, human resources, etc. in one or more database structures created by a business service provider (e.g., commercially available systems from SAP AG®). FIG. 1 is a block diagram of a system 100 according to some embodiments. In this case, a business service provider 110 might host and provide business services for a customer or client 120. For example, the business service provider 110 might receive requests from the client 120 and provide responses to the client 120 via a service-oriented architecture as understood by those of skill in the art. The use of the remotely hosted business process platform may help the client 120 avoid the costs and problems associated with maintaining a local, "in house" Enterprise Resource Planning (ERP) system.

The client 120 may be associated with a Web browser that accesses services provided by business service provider 110 via HyperText Transport Protocol (HTTP) communication. For example, a user may manipulate a user interface of the client 120 to input an instruction (e.g., "show me a sales report"). The client 120, in response, may transmit a corresponding HTTP service request to the business service provider 110 as illustrated. A service-oriented architecture may conduct any processing required by the request (e.g., generating views and user interfaces) and, after completing the processing, provide a response to client 120. The client 120 might comprise a Personal Computer (PC) or mobile device executing a Web client. Examples of a Web client include, but are not limited to, a Web browser, an execution engine (e.g., JAVA, FLASH, or SILVERLIGHT) that executes associated code in a Web browser, and/or a dedicated standalone application.

Note that FIG. 1 represents a logical architecture for describing processes according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, magnetic disk, and solid state Random Access Memory (RAM) or Read Only Memory (ROM) storage units. Embodiments are therefore not limited to any specific combination of hardware and software.

The business service provider 110 might store client information into and retrieve client information from one or more database structures, such one or more "business objects." As used herein, the phrase "business object" may refer to a set of entities with common characteristics and common behavior representing a defined business semantic. Note that business data may be stored within physical tables of a database. The database may comprise a relational database such as SAP MAXDB, ORACLE, MICROSOFT SQL SERVER, IBM DB2, TERADATA and the like. Alternatively, the database could be a multi-dimensional database, an eXtendable Markup Language (XML) document, or any other structured data storage system. The physical tables may be distributed among several relational databases, dimensional databases, and/or other data sources.

The structures of and relationships between the physical database tables may be complex, and business objects may be used to shield developers and end-users from these complexities. A business object may comprise, for example, a software model including nodes to encapsulate related data and methods. Moreover, a business object may be associated with a business entity, such as a customer, partner, sales order, product, store, time, etc., represented in the data of a data source. Each instance of a business object may represent a particular instance of the entity represented by the business object. An instance of a sales order business object may, for example, provide a mapping to the underlying tables storing data associated with a particular sales order.

In general terms, the business object model defines business-related concepts for a number of business transactions. The business object model may reflect the decisions and relationships about real world businesses acting in business transactions and may span across different industries and business areas. The business object model may be, for example, defined by business objects and their relationships to each other. Despite being applicable across different business entities and industries, business object model interfaces may be consistent across the different industries and across different business units because they are generated using a single business object model.

The business service provider 110 may provide a general framework to be used by a number of different clients 120. In some cases, however, a particular client 120 might modify or extend the general framework (e.g., by adding a new field to a particular form or modifying a business object). Moreover, a single client 120 might utilize several different extensions (or versions of the generic framework) based on its business needs. For example, the client 120 might add a tax identifier to a generic purchase order form when the form is used within Germany but not when the form is used outside Germany. According to some embodiments, one or more partners 130 may also develop extensions and/or new applications for clients 120.

Figure 2:
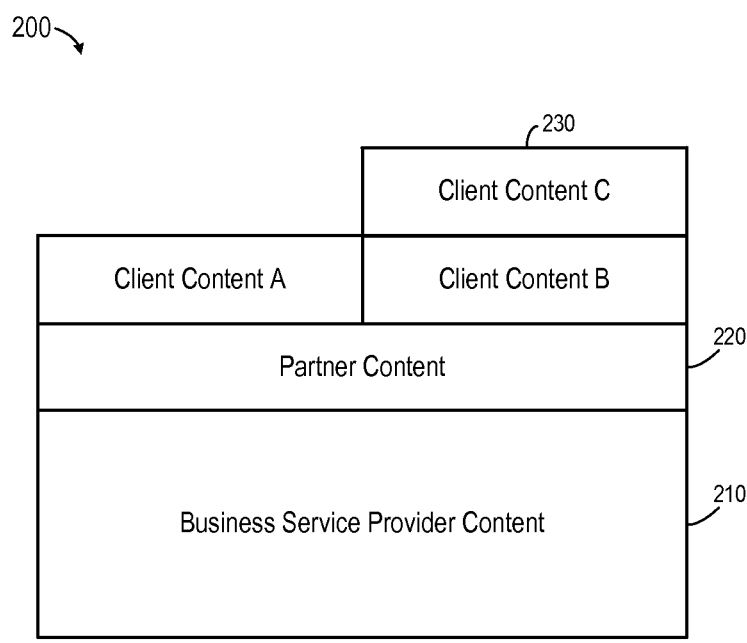
FIG. 2 illustrates layers of content associated with a business service according to some embodiments.

For example, FIG. 2 illustrates layers 200 of content associated with a business service according to some embodiments. In this case, an original layer of business service provider content 210 may be modified by partner content 220. Additional extension or changes may be provided by modifications in a client content layer 230. For example, one version of the framework might comprise client content A layered over the partner content 220. Another version might comprise client content C layered over client content B, which in turn was layered over the partner content 220. It can be difficult, however, for a customer or client to maintain and/or track these various versions of the business service framework. For example, a customer might want to group various extensions or adaptations in a logical way to facilitate the activation, de-activation, and/or movement of those changes. To address this need, an entirely new project management infrastructure could be created. Such an approach, however, might be an expensive undertaking and could be too complex for some customers.

Accordingly, methods and mechanisms to flexibly and efficiently manage such extension projects are provided by some embodiments herein.

Figure 3:
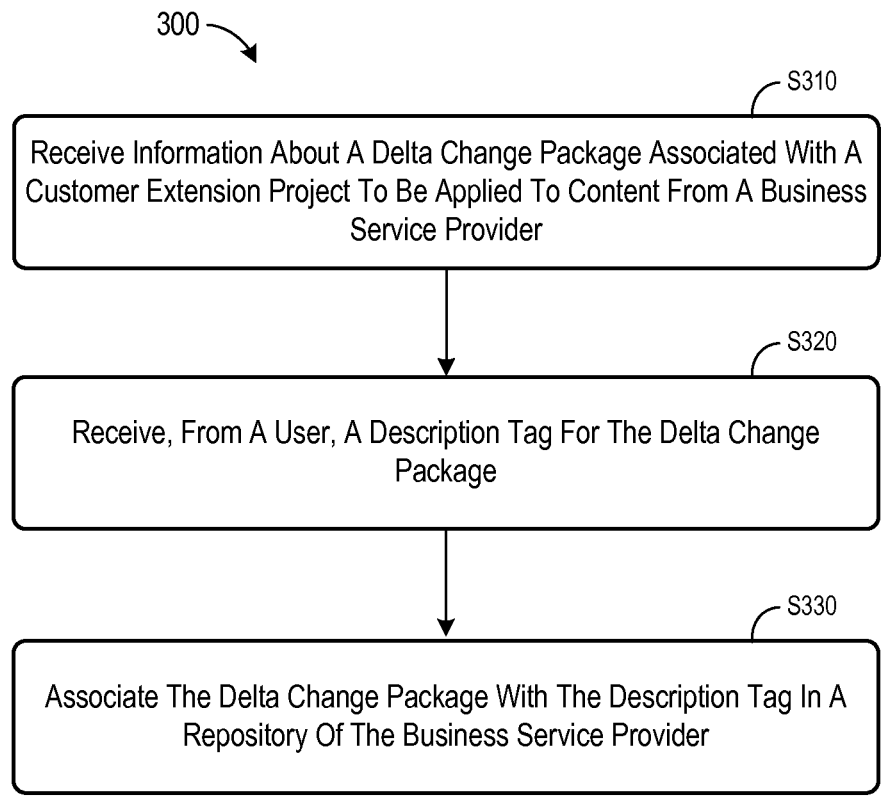
FIG. 3 is a flow diagram of a process according to some embodiments.

In particular, FIG. 3 is a flow diagram of a process 300 according to some embodiments. The business service provider 110 and/or client 120 may execute portions of the process 300 as will be described below, but embodiments are not limited thereto. In this regard, all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S310, information is received about a delta change package associated with a customer extension project to be applied to content from a business service provider. For example, a user associated with the customer might provide one or more adaptations to a user interface or business object. At S320, a description "tag" for the delta change package is received from the user. The description tag might comprise, for example, an alphanumeric string that describes the purpose or function of the delta change package. According to some embodiments, a user might select the descriptive tag from a list of potential or possible tags. At S330, the delta change package is associated with the description tag in a repository of an execution platform of the business service provider. For example, the description tag may be stored in the repository along with a link to the delta change package. The description tags may then be used to logically group delta change packages (e.g., a user might ask to see a list of change packages associated with a particular tag).

Such an approach may provide extensible and flexible capabilities to customers and/or partners. For example, a customer might use tags to organize extensions in extension projects or bundles (e.g., where the project group extension artifacts logically belong together). Moreover, customers may organize their adaptations and extensions in logical groups that they can manage themselves in terms of activation/deactivation/transport of extension bundles.

Note that a customer may want to perform multiple extensions to a single entity in different projects (e.g., using one extension for scenario one and another extension on the same entity some time later for scenario two). According to some embodiments, entity tagging (properties) provided by a repository are used to assign projects (enabled via tags) to an entity. As a result, a customer may quickly search for entities belonging to a particular extension project by leveraging the tags. Other features for handling extension projects (e.g., consistency checks) may also be supported, according to some embodiments, by selecting the entities via tags and checking consistency on the entity list.

Figure 4:
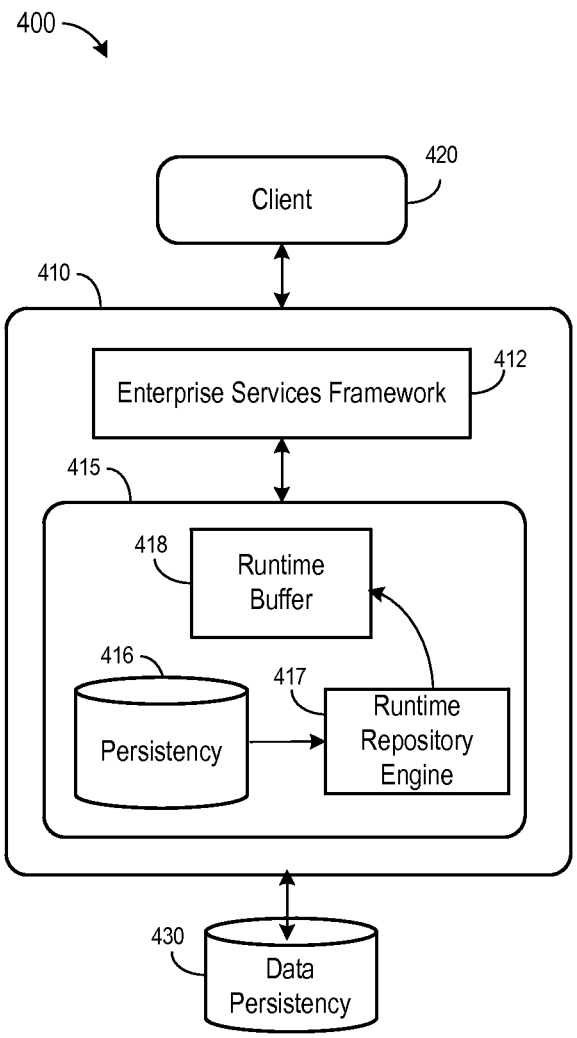
FIG. 4 is a detailed block diagram illustrating a repository architecture according to some embodiments.

Note that the process 300 of FIG. 3 could be implemented using any of a number of different hardware and/or software configurations. FIG. 4 is a block diagram of one system 400 that might be implemented according to some embodiments. The system 400 includes business process platform 410 to provide services to client 420 according to some embodiments. The business process platform 410 may comprise the Application Platform provided by SAP of Walldorf, Germany and based on SAP Netweaver® and/or byDesign®, but is not limited thereto. In this regard, FIG. 4 represents a logical architecture for describing systems and processes according to some embodiments. The architecture may be implemented using any arrangement of hardware devices, data structures, and program code.

The client 420 may comprise any suitable device. For example, the device may include any necessary software to support a proprietary interface (e.g., a proprietary client application) or execution engine (e.g., a Web browser). Client 420 is also capable of communication (including sporadic communication—e.g., mobile devices) with business process platform 410.

More specifically, client 420 may use application programming interfaces exposed by enterprise services framework 412 to request read and write access to business object instances stored in data persistency 430. The business object instances are instances of corresponding business object models. A repository 415 may provide data of the business object models to describe the structure and attributes of instances thereof. Enterprise services framework 412 therefore uses data provided by repository 415 to access business object instance data stored in data persistency 430. The repository 415 includes persistency 416, runtime repository engine 417 and runtime buffer 418. During runtime, runtime repository 417 populates runtime buffer 418 based on information stored in persistency 416.

Figure 5:
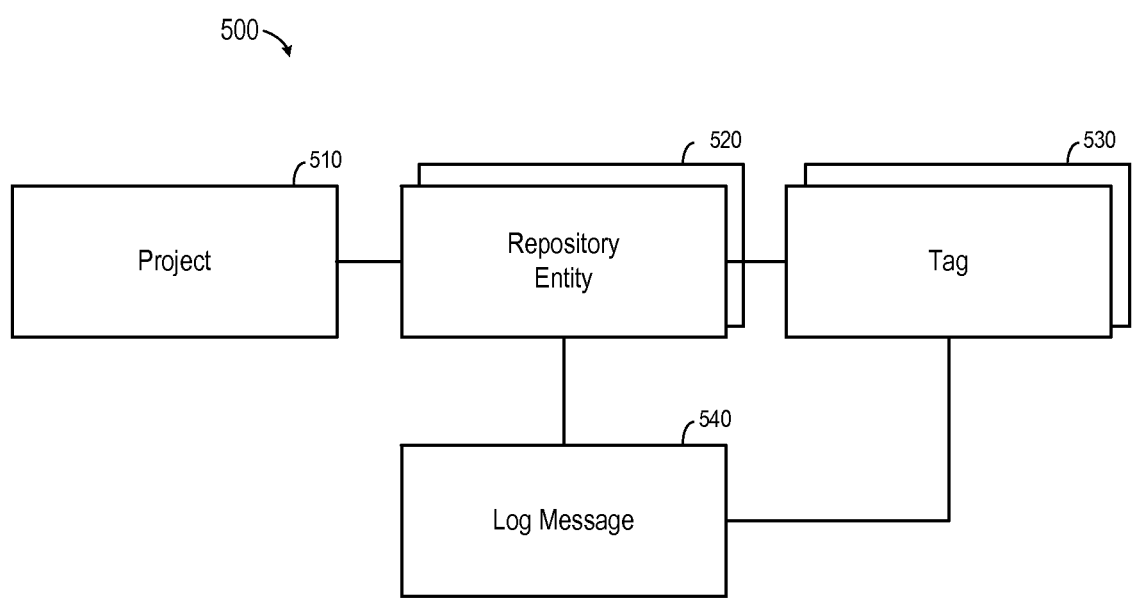
FIG. 5 is a block diagram illustrating tagging for customer extensions according to some embodiments.

According to some embodiments, the repository 415 may store project maintenance data, including descriptive tag information, associated with one or more extension projects of the client 420. FIG. 5 is a block diagram 500 illustrating tagging for customer extensions according to some embodiments. Note that a single project 510 may be associated with a number of repository entities 520 and associated tags 530. Moreover, a log message 540 may be used to associate tags 530 with repository entities 520.

Figure 6:
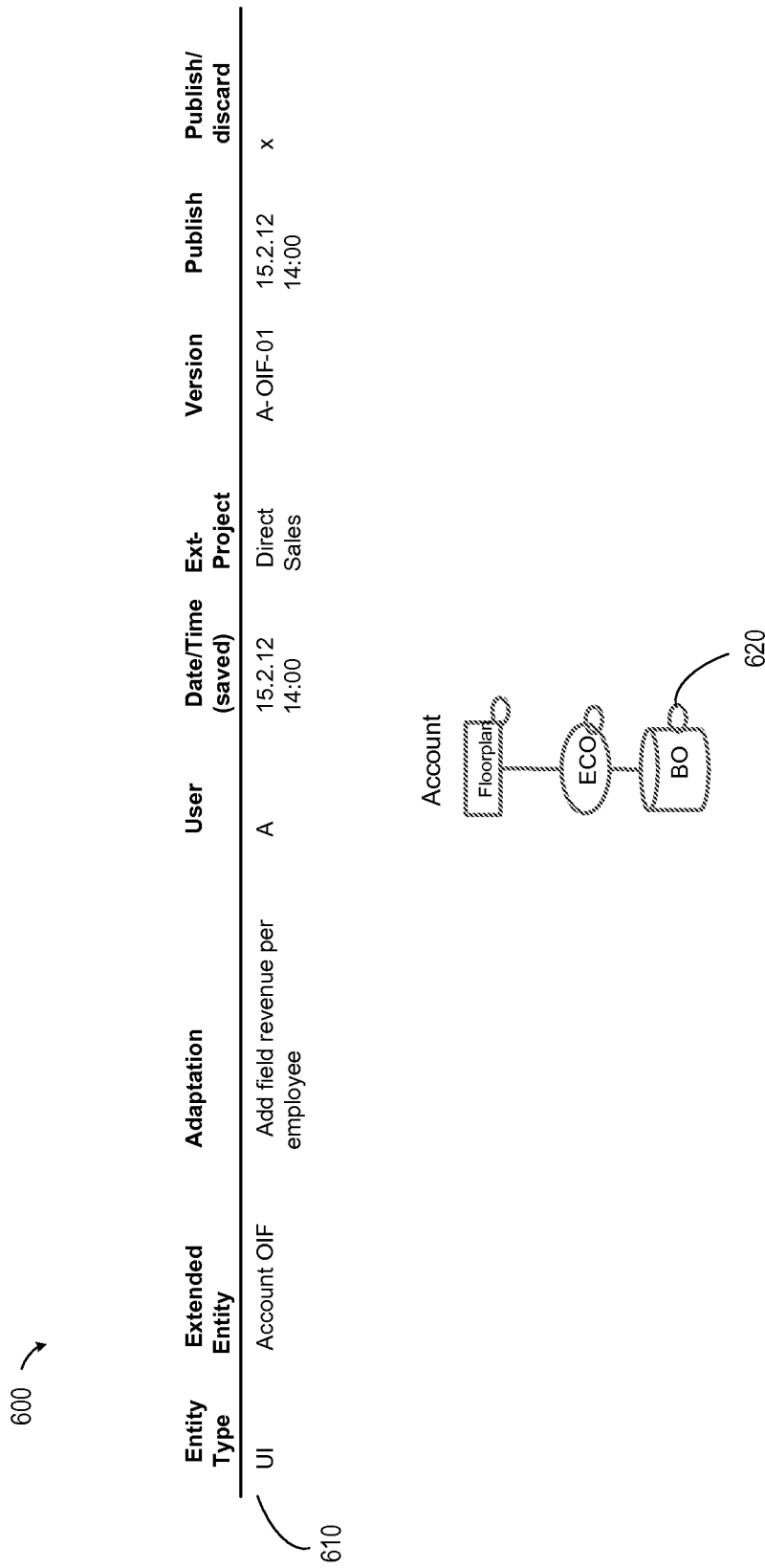

For example, FIG. 6 illustrates a project maintenance table 600 according to some embodiments. In this example, user "A" defines a new field entitled "revenue per employee" to an extended entity called "Account OIF." The account OIF might be associated with, for example, an Object Instance Floorplan (e.g., a user interface showing an account). As a result of this new definition, an entry 610 is created in the project maintenance table 600. The entry 610 includes the entity type (e.g., user interface or form), the extended entity, a description of the adaptation, a user identifier, the date and time when the adaptation was saved, an extension project identifier (e.g., the description tag "Direct Sales"), and the date and time when the adaptation was published (e.g., as described with respect to FIG. 20). Moreover, a delta change package (D-01) for the user interface of "Account OIF" may be created along with delta changes 620 for an associated Enhanced Controller Object (ECO) (e.g., a controller for a user interface), Business Object (BO) node, Fast Search Infrastructure (FSI) data, etc.

Figure 7:
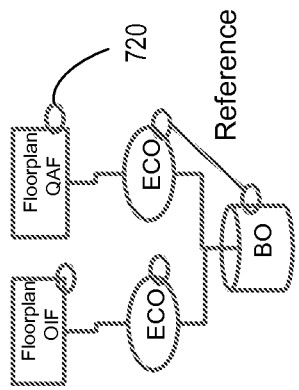

FIG. 7 illustrates a project maintenance table 700 after user A defines a new field entitled "revenue per employee" to an extended entity called "Account QAF" (e.g., a Quick Activity Floorplan pattern for a user interface). As a result, a second entry 710 is created in the project maintenance table 700. The entry 710 includes the entity type (another UI), the extended entity, a description of the adaptation, a user identifier, the date and time when the adaptation was saved, an extension project identifier (e.g., the same description tag "Direct Sales"), and the date and time when the adaptation was published. Moreover, a delta change package (D-01) for the user interface of "Account OAF" may be created along with delta changes 720 for an associated ECO, BO node, FSI data, etc. Note that the entries of project maintenance table 700 might be grouped and/or ordered in any of a number of different ways (e.g., by entity type or extended entity). Moreover, some embodiments may provide a user interface driven approach and an extension field may be generated when published the first extended entity that uses it.

Figure 8:
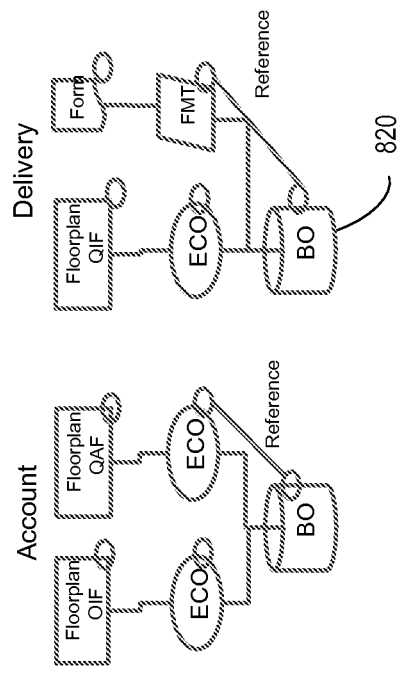

Now assume that user A adds a new field "EAN" to delivery note on delivery OIF (e.g., a UI change) and adds a field "EAN" to the delivery note (e.g., a form change). As a result, new entries 810 of project maintenance table 800, associated with the delivery entity 800, are illustrated in FIG. 8. Another user, user "B," then adds a new field entitled "language" to Account OIF. As a result, a new entry 910 is added to the project maintenance table 900 illustrated in FIG. 9. Note that this new entry 910 is associated with a different description tag ("Social CRM"). Also note that a new delta package "A-OIF-02" is now applied over the prior "A-OIF-01."

FIG. 10 illustrates another view 1000 of the framework wherein the view 1000 is version based (instead of being based on delta information). In this approach, a single entry 1010 may include information about a number of different changes. For example, entity type BO includes "new field revenue per employee" and "new field language" changes. Moreover, description tags of both "Direct Sales" and "Social CRM" are associated with that entry 1010. In addition, a separate display 1020 provides the user identifier and associated save date and time.

Note that the entries 1010 include a graphical icon (represented as a "+" in FIG. 10). FIG. 11 illustrates how a view 1100 would be represented when the "+" associated with entity type "BO" is selected by the user. Note that the "+" symbol has been replaced with a "−" symbol 1110. This view 1100 represents a "drill down" display into the BO account and appropriate versions (e.g., V01 or V02) are displayed for each entry. Similarly, FIG. 12 illustrates how a view 1200 would be represented when the "+" associated with entity type "UI" is selected by the user. As before, the "+" symbol has been replaced with a "−" symbol 1210. This view 1100 represents a "drill down" display into the BO account and appropriate versions (e.g., V01 or V02) are displayed for each entry.

Now assume the user wishes to discard "V02" of the Account OIF. FIG. 13 illustrates that the user may deselect that entry in the table 1300 (e.g., by replacing the "x" in the publish/discard column with a blank space 1310). The result of this action is illustrated by the project maintenance table 1400 of FIG. 14. Note that the entry 1410 now includes only "Add field revenue per employ" and not "Add field language." Next, assume that user A re-arranges the "revenue" and "language" fields for Account OIF." FIG. 15 illustrates the project maintenance table 1500 with a new entry 1510 indicating that a delta package "A-OIF-03" has been created for Account OIF.

Note that the information in the project maintenance table can be grouped, arranged, and/or sorted in any of a number of different ways. The table 1500 of FIG. 15 is ordered based on entity type (e.g., all "UI" entries are then followed by the "Form" entry). According to some embodiments, a user might mouse click the "Ext-Project" column header to re-order the entries. In particular, FIG. 16 illustrates a project maintenance table 1600 that is now ordered based on the ext-project description tags 1610. That is, all "Direct Sales" entries are then followed by the "Social CRM" entry).

Figure 17:
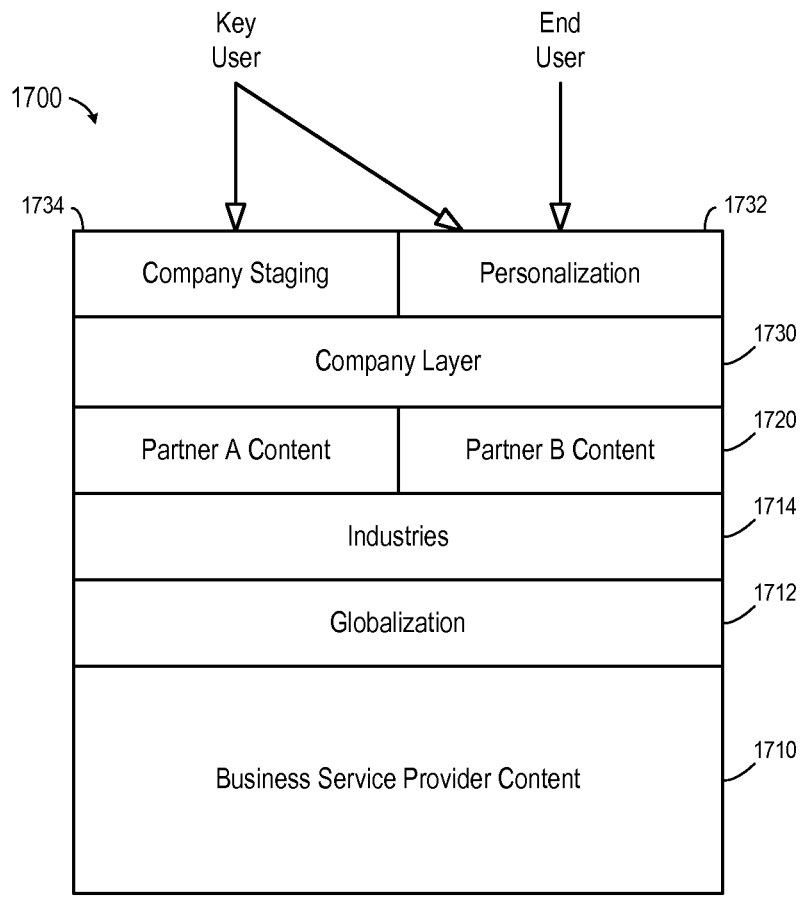
FIGS. 17 and 18 illustrate business service content layering according to some embodiments.

The project maintenance tables and descriptive tags may help users create adaptations of business service provider content. For example, FIG. 17 illustrates business service content layering 1700 according to some embodiments. At the lowest layer of the repository, business service provider content 1710 may be changed with globalization content 1712 and industries content 1714. Partner content 1720 may then be applied followed by an over-all company layer 1730 for a client or customer. Personalization content 1732 might then be applied (e.g., to tailor a display for a particular end user). Company staging content 1734 might also be applied to the company layer 1730 (e.g., to let a key user create and/or test new adaptations and extensions).

Figure 18:
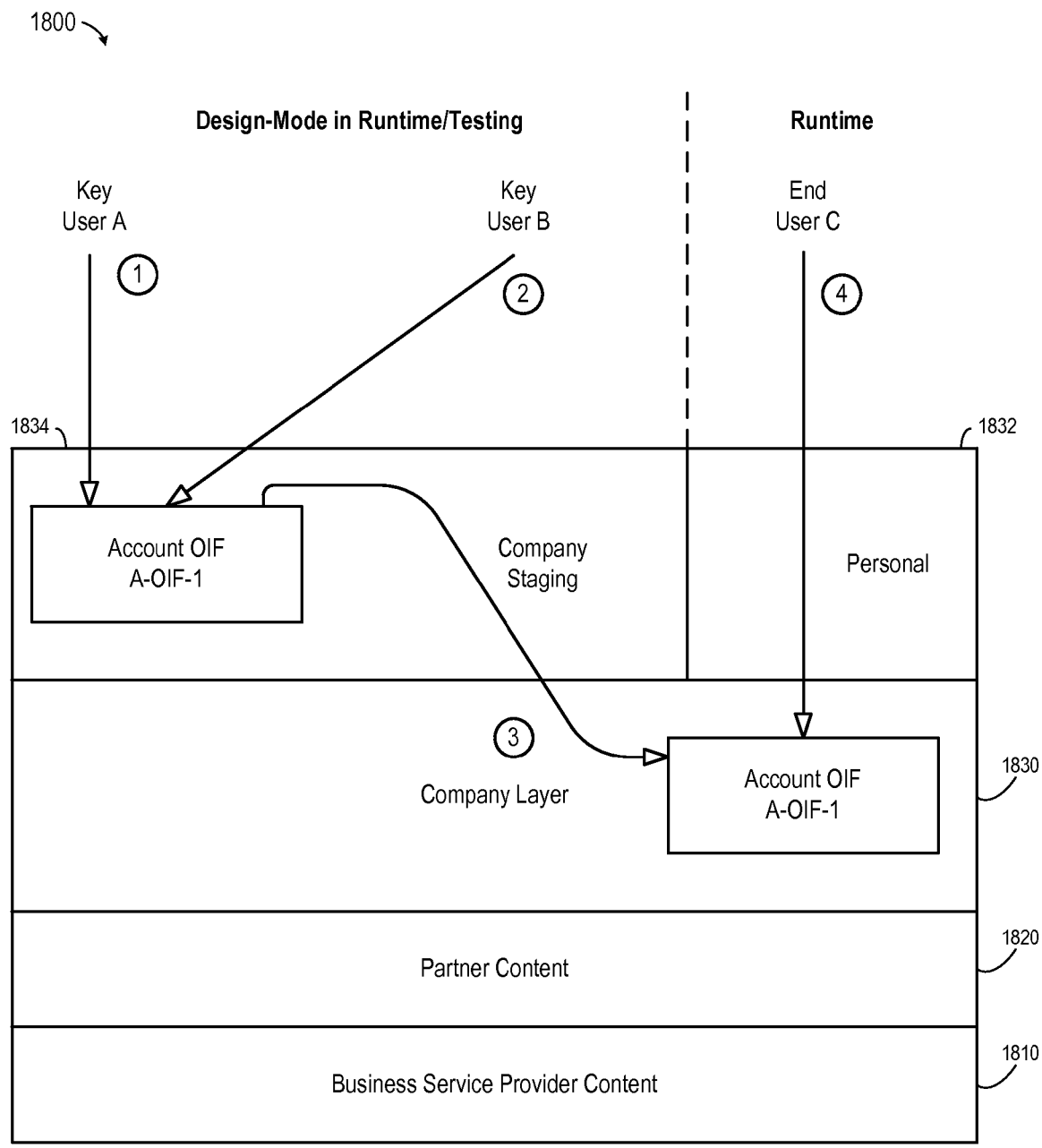

In this way, a key user might be able to make changes without making them directly available to other users (and let him or her test company-wide settings without interfering with other users). For example, FIG. 18 illustrates a data flow 1800 according to some embodiments associated with business service provider content 1810, partner content 1820, a company layer 1830, personal content 1832, and company staging layer 1834. In this example, key user A adapts a screen display, presses save, and exits design-time mode at "time 1". As a result, a new delta package "Account OIF A-OIF-1" is created in the company staging layer 1834. At "time 2," key user B enters design-time mode, tests the new screen, and exits. At "time 3," key user A publishes the extended entity and the delta package is moved from the company staging layer 1834 to the company layer 1830. End user C may then access the screen and view the published changes at "time 4."

In this way, changes (e.g., extensions or adaptations) may be flexibly deployed in the system. Adding extension fields, making fields visible or rearranging the UI are some examples of these types of changes that may be made to business service provider "objects." As used herein, the term "object" might refer to entities for which these changes can be applied (extended objects), including floorplans, form templates, business objects, and reports.

An extension project may refer to a grouping of semantically related changes (e.g., done as part of the on-boarding of a new account) and may let a user find all extended objects and their changes related to the project. The grouping functionality provided by extension projects may realized by tagging the changes and grouping the changes on UI level. Changes done by a key user may be stored in a default project (repository "project" object). To resolve conflicting changes on the same object, all objects (extended entities) which are changed during an adaptation session might be locked as long as the user is in runtime authoring mode for that object.

As used herein, an "extended entity" may refer to any entity that is extended (e.g., a screen, form, or business object), and an "extension" might refer to an entity describing the extension/adaptation of an extended entity as meta data (e.g., a screen layout change, adding a company logo to a form, or an entirely new extension field).

According to some embodiments, changes for an extended object are stored in a change history. The change history might, for example, provide information on tag(s), defined by the user when creating the change (on save), whether the change is published/un-published, a date and time of the change, a user identifier, and/or a human readable description about the change.

Referring again to FIG. 5, a customer defined tagging mechanism 530 may comprise a simple "classification" that is attached to the repository entity 520. This tagging allows an n:m relation; that is, each entity can have multiple tags and each tag can be added to multiple entities. A result, a customer can perform his or her extensions in the system and can add tags to the extensions as desired.

For example, assuming a UI where a customer key user first changes something in the context of a scenario with "ONE" (acting as a customer or a supplier for the company). In another step, the same company also has some business with "TWO" where a similar extension is required.

When adding the first extension, the first tag might be added:

| | | | |
|---|---|---|---|
| Com.sap.Partner.OIF | "ONE" | | |
| Field added <Fieldname> | <user> | <Time> | "ONE" |

When adding the second extension, the next tag is added:

| | | | |
|---|---|---|---|
| Com.sap.Partner.OIF | "ONE", "TWO" | | |
| Field added <Fieldname> | <user> | <Time> | "ONE" |
| Field added <Fieldname> | <user> | <Time>-) | "TWO" |

Based on the tags, it may be possible to show all extensions for customers either in a flat list (e.g., ordered by time or user) or to group them by tag (e.g., show all extensions for "ONE").

With such a grouping, note that the same entity can appear in multiple groups (e.g., when multiple tags are attached). Moreover, it may be possible select related repository entities and publish them at the same time (or to release them from test to a productive system). Note that tags 530 might be added to the log message 540 in addition to the repository entities 520. This might help a user identify what changes have been done (and in what context).

According to some embodiments, a consistency check may be performed for an assembly of extension entities. For example, on assembly such a check might evaluate whether or not all required artifacts are together on the assembly list (e.g., a field usage on the UI for an extension field might cross-check that the extension field definition is also on the assembly list). The consistency check might be performed when publishing from a staging area to a company wide layer as well as for other movements of extension entities (e.g., between test and productive environments). When unpacking extension entities after a move between test/productive environments, there may also be a consistency check to determine if the extension entities are consistent. These checks might be, for example, the same ones as were done for a manual creation of the extension entities in the target environment.

When assembling entities via tags (e.g., grouping), note that cross-tag dependencies might exist. For example, if a UI contains two extension fields that are related to different tags, the UI itself may belong to both contexts (tags). In this case, the consistency check for the UI may needs to detect that both extension field definitions are on the assembly list, and whether the selection has been done via the one or the other tag. If one entity is missing, the consistency check might create a message and inhibit publication of the incomplete assembly list.

Figure 19:
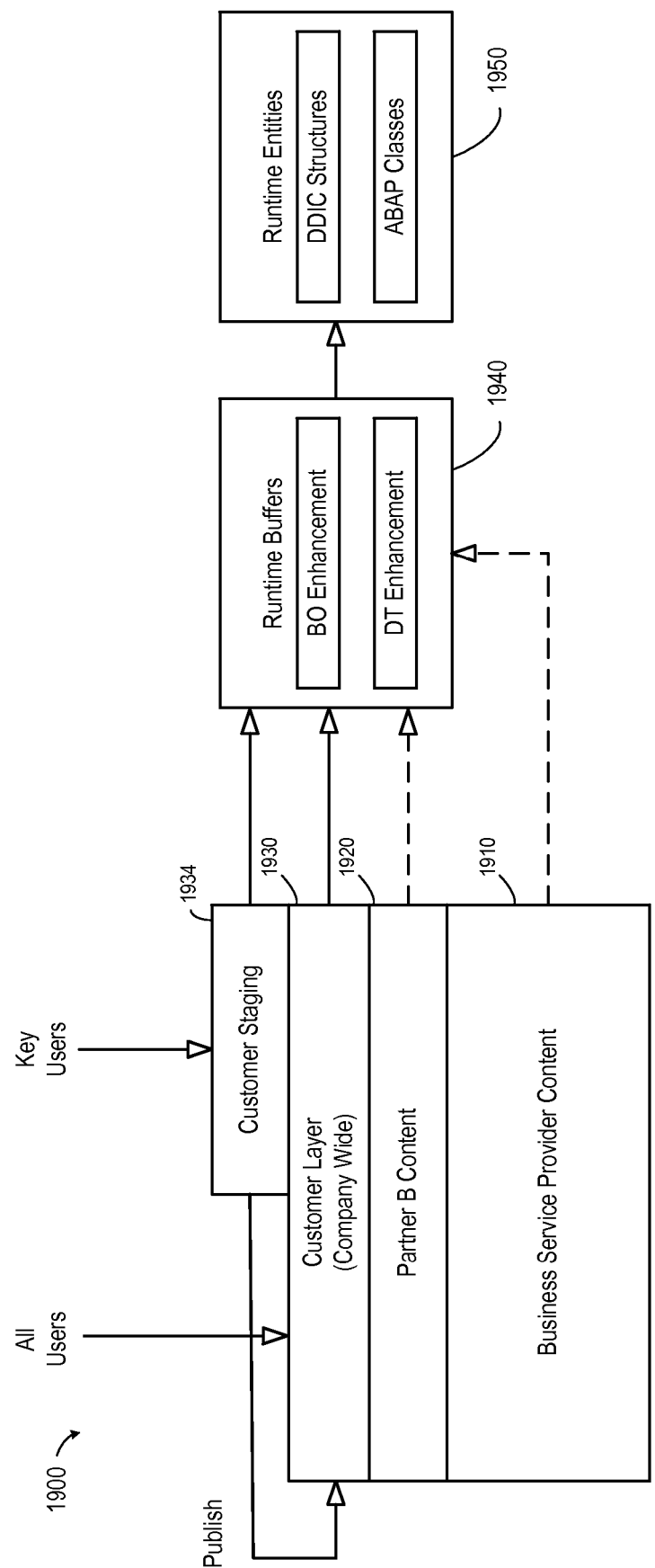
FIG. 19 is a block diagram illustrating a customer with runtime buffers according to some embodiments.

Referring now to FIG. 19, key users in the system may perform adaptations and extensions (e.g., directly in a productive system). As before, partner content 1920 may be applied to business service provider content 1910. According to some embodiments, the key user may adopt/extend the system, save the changes within a staging layer 1934 (which is only active for this user—or a group of key users—but is not company wide) and test the changes. The staging layer 1934 is an additional layer on top of the company wide layer 1930 and used for key user testing. The company wide layer 1930 may contain the active extensions for all users of this customer/environment. Key user extension may be moved from staging layer 1934 to company wide layer 1930 as soon as extensions are "published".

Although content in the repository is separated in layers, the extensions may be generated into the runtime buffers 1940 and runtime artifacts already upon saving. This generation of runtime entities 1950 may be independent of which customer layer the artifacts are saved to. When moving the entities from the customer staging layer 1934 to the company wide layer 1930, the entities 1950 and its generated artifacts may remain the same (e.g., the only difference from a repository point of view might be that a different set of users access the entities).

The embodiments described herein are solely for the purpose of illustration. Those in the art will recognize other embodiments may be practiced with modifications and alterations limited only by the claims.

What is claimed is:
1. A computer implemented method, comprising:
 receiving information about a delta change package associated with a customer extension project to be applied to content from a business service provider;

receiving, from a user, a first description tag for the delta change package and a second description tag for the delta change package, the first description tag associated with a first particular customer extension project and the second description tag associated with a second particular customer extension project;

associating the delta change package with the first description tag and the second description tag in a same repository of an execution platform of the business service provider, the repository comprising (i) the first description tag with a link to the delta change package and (ii) the second description tag with the link to the delta change package;

determining, via a computer, a list of delta change packages belonging to the first particular customer extension project by grouping delta change packages based on the first description tag; and assembling, via the computer, the first customer extension project based on first description tag where assembly comprises evaluating (i) whether all required artifacts associated with the first customer extension project are included and (ii) whether the grouping of delta change packages was based on the first description tag or the second description tag.

2. The method of claim 1, wherein information about the delta change package is stored in a project maintenance table, associated with the repository, along with the first description tag and the second description tag.

3. The method of claim 2, wherein the project maintenance table further stores at least one of: (i) an entity type, (ii) an extended entity identifier, (iii) an adaptation description, (iv) a user identifier, (v) a save date and time, (vi) an extension project identifier, (vii) a version identifier, or (viii) a publication date and time.

4. The method of claim 2, wherein information from the project maintenance table is displayed to the user via a user interface.

5. The method of claim 4, wherein the user interface is selectable to provide a drill down view associated with a business object.

6. The method of claim 1, wherein multiple description tags are associated with the delta change package.

7. The method of claim 1, wherein multiple delta change packages are associated with the first customer extension project, each multiple delta change package sharing the first description tag.

8. The method of claim 1, wherein log messages store information linking the first description tag to the delta change package.

9. The method of claim 1, further comprising:
executing the delta change package in a staging layer; and
publishing the delta change package from the staging layer to a company-wide layer.

10. A non-transitory, tangible computer-readable medium storing program code executable by a computer to:
receive information about a delta change package associated with a customer extension project to be applied to content from a business service provider;
receive, from a user, a first description tag for the delta change package and a second description tag for the delta change package, the first description tag associated with a first particular customer extension project and the second description tag associated with a second particular customer extension project;
associate the delta change package with the first description tag and the second description tag in a same repository of an execution platform of the business service provider, the repository comprising (i) the first description tag with a link to the delta change package and (ii) the second description tag with the link to the delta change package;
determine, via a computer, a list of delta change packages belonging to the first particular customer extension project by grouping delta change packages based on the first description tag; and
assemble, via the computer, the first customer extension project based on first description tag where assembly comprises evaluating (i) whether all required artifacts associated with the first customer extension project are included and (ii) whether the grouping of delta change packages was based on the first description tag or the second description tag.

11. The medium of claim 10, wherein information about the delta change package is stored in a project maintenance table, associated with the repository, along with the first description tag.

12. The medium of claim 11, wherein the project maintenance table further stores at least one of: (i) an entity type, (ii) an extended entity identifier, (iii) an adaptation description, (iv) a user identifier, (v) a save date and time, (vi) an extension project identifier, (vii) a version identifier, or (viii) a publication date and time.

13. The medium of claim 11, wherein information from the project maintenance table is displayed to the user via a user interface grouped according to description tags.

14. A business service provider execution platform, comprising:
a hardware communication port to receive: (1) information about a delta change package associated with a first customer extension project and a second customer extension project to be applied to content from a business service provider, (2) a first description tag for the delta change package associated with the first customer extension project, and (3) a second description tag for the delta change package, the second description tag associated with the second customer extension project;
a repository to store associations between the delta change package and the first and second description tags in a same repository of an execution platform of the business service provider, the repository comprising (i) the first description tag with a link to the delta change package and (ii) the second description tag with the link to the delta change package;
and
an engine to apply the delta change package to the content from the business service provider and to determine a list of delta change packages belonging to the first customer extension project by grouping delta change packages based on first description tag and to assemble the first customer extension project based on the first description tag where assembly comprises evaluating (i) whether all required artifacts associated with the first customer extension project are included and (ii) whether the grouping of delta change packages was based on the first description tag or the second description tag.

15. The business service provider execution platform of claim 14, further comprising:
runtime buffers supporting enhancements associated with the delta change package, and
runtime entities supporting structures and classes associated with the delta change package.

16. The business service provider execution platform of claim 14, further comprising:

a display engine to display project maintenance table data, including the description tag, to a user, wherein the displayed data further includes at least one of: (i) an entity type, (ii) an extended entity identifier, (iii) an adaptation description, (iv) a user identifier, (v) a save date and time, (vi) an extension project identifier, (vii) a version identifier, or (viii) a publication date and time.

17. The business service provider execution platform of claim 16, wherein information from the project maintenance table is displayed to the user via a user interface and is selectable to sort table entries according to description tags.

* * * * *